United States Patent
Kwon et al.

(10) Patent No.: US 8,859,158 B2
(45) Date of Patent: Oct. 14, 2014

(54) SYSTEM AND METHOD FOR CONTROLLING OPERATION OF FUEL CELL HYBRID SYSTEM BY SWITCHING TO BATTERY POWER IN RESPONSE TO IDLE STOP CONDITION

(75) Inventors: Sang Uk Kwon, Gyeonggi-do (KR); Nam Woo Lee, Gyeonggi-do (KR); Kyu Il Lee, Gyeonggi-do (KR); Soon Il Jeon, Gyeonggi-do (KR); Seong Pil Ryu, Gyeonggi-do (KR); Jung Hwan Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 496 days.

(21) Appl. No.: 13/184,811

(22) Filed: Jul. 18, 2011

(65) Prior Publication Data
US 2012/0141895 A1    Jun. 7, 2012

(30) Foreign Application Priority Data

Dec. 1, 2010  (KR) ........................ 10-2010-0121130

(51) Int. Cl.
 *H01M 8/04* (2006.01)
 *H01M 16/00* (2006.01)
(52) U.S. Cl.
 CPC ...... *H01M 8/04223* (2013.01); *H01M 8/04865* (2013.01); *H01M 8/04925* (2013.01); *H01M 8/04037* (2013.01); *H01M 8/04253* (2013.01); *H01M 8/04365* (2013.01); *H01M 8/04395* (2013.01); *H01M 8/04559* (2013.01); *H01M 8/04731* (2013.01); *H01M 8/04753* (2013.01); *H01M 8/04798* (2013.01); *H01M 8/0488* (2013.01); *H01M 16/006* (2013.01); *Y02T 90/34* (2013.01); *Y02E 60/50* (2013.01)
 USPC ............ 429/432; 429/431; 429/429; 429/444
(58) Field of Classification Search
 CPC ..................... H01M 8/04753; H01M 8/04895; H01M 8/04865; H01M 8/04925
 USPC .................................. 429/431, 432, 429, 444
 See application file for complete search history.

(56) References Cited

U.S. PATENT DOCUMENTS

| | | | |
|---|---|---|---|
| 2009/0104490 A1* | 4/2009 | Shin et al. ........................ | 429/23 |
| 2009/0263683 A1* | 10/2009 | Baumann et al. ............... | 429/17 |
| 2010/0009219 A1* | 1/2010 | Kwon et al. ..................... | 429/13 |
| 2010/0092819 A1* | 4/2010 | Umayahara et al. ............ | 429/22 |
| 2010/0151289 A1* | 6/2010 | Sun et al. ........................ | 429/13 |
| 2011/0076580 A1* | 3/2011 | Shimoi et al. .................. | 429/429 |

FOREIGN PATENT DOCUMENTS

| | | |
|---|---|---|
| JP | 2001-359204 A | 12/2001 |
| KR | 10-0669882 | 3/2006 |
| KR | 10-2009-0033272 | 4/2009 |

(Continued)

*Primary Examiner* — Zachary Best
(74) *Attorney, Agent, or Firm* — Edwards Wildman Palmer LLP; Peter F. Corless

(57) ABSTRACT

The present invention provides a hybrid fuel cell system that is configured to determine if an idle stop condition has been satisfied during a normal operation mode of the hybrid fuel cell system, cut off air supply to a fuel cell to stop power generation of the fuel cell and reduce a voltage which the fuel cell outputs in response to determining that the idle stop condition has been satisfied. The voltage of a bidirectional converter, connected between a battery and a bus terminal is reduced and the output of the fuel cell is controlled, based on a first predetermined value and maintained at that first predetermined value. Subsequently, the battery is charged via the output current of the fuel cell generated by maintaining the reduced voltage of the bidirectional converter.

10 Claims, 5 Drawing Sheets

(56) References Cited

FOREIGN PATENT DOCUMENTS

| KR | 10-2009-0096649 | | 9/2009 |
|----|----|----|----|
| KR | 10-2009-0097958 | | 9/2009 |
| KR | 10-2010-0005767 | A | 1/2010 |
| KR | 10-2010-0005768 | A | 1/2010 |
| WO | WO 2009150990 | A1 * | 12/2009 |

* cited by examiner

SYSTEM AND METHOD FOR CONTROLLING OPERATION OF FUEL CELL HYBRID SYSTEM BY SWITCHING TO BATTERY POWER IN RESPONSE TO IDLE STOP CONDITION

CROSS-REFERENCE TO RELATED APPLICATION

This application claims under 35 U.S.C. §119(a) the benefit of Korean Patent Application No. 10-2010-0121130, filed Dec. 1, 2010, the entire contents of which are incorporated herein by reference.

BACKGROUND (a) Technical Field

The present invention relates to a system and method for controlling the operation of a fuel cell hybrid system. More particularly, it relates to a system and method for controlling the operation of a fuel cell hybrid system by using a fuel cell as a main power source and an energy storage device as an auxiliary power source, which can effectively avoid a low power and low efficiency region of a fuel cell during operation.

(b) Background Art

A typical fuel cell system within a hydrogen fuel cell vehicle includes a fuel cell stack for generating electricity by an electrochemical reaction of reactant gases, a hydrogen processing system for supplying hydrogen as a fuel to the fuel cell stack, an air processing system for supplying oxygen containing air as an oxidant required for the electrochemical reaction in the fuel cell stack, and a thermal management system (TMS). The TMS is responsible for removing reaction heat from the fuel cell stack to the outside of the fuel cell system, controlling operation temperature of the fuel cell stack, and performing water management function.

In the fuel cell system for a vehicle, when only the fuel cell is used as a power source for the vehicle, all loads that constitute the vehicle are powered by the fuel cell, and thus the performance of the fuel cell may deteriorate during operation where the efficiency of the fuel cell is low.

Consequently, when a sudden load is applied to the vehicle, the output voltage of the fuel cell suddenly drops, and thus sufficient power is not supplied to a drive motor, which may deteriorate the performance of the vehicle. Furthermore, a fuel cell has unidirectional output characteristics, and thus it is difficult to recover energy from the drive motor during braking of the vehicle. Accordingly, this also deteriorates the performance of the vehicle.

In an effort to overcome these drawbacks, the automotive industry has developed a fuel cell hybrid vehicle. The fuel cell hybrid vehicle is equipped with a suitable energy storage device such as a high voltage battery or a supercapacitor as an auxiliary power source for providing suitable power required for driving the drive motor and high voltage components in addition to the fuel cell as a main power source.

In this hybrid system, an idle stop mode, in which the power generation of the fuel cell is stopped in an idle state of the vehicle, is used. To avoid the low power region and thus improve the efficiency of the fuel cell system and increase the durability, a variety of methods for the avoidance operation of the low efficiency region have been proposed.

Typically, in a system where a fuel cell and a supercapacitor are directly connected together, the air supply is cut off to shut off the output of a fuel cell hybrid system. By doing so, the output of a fuel cell is directly controlled via the voltage of a bidirectional power converter.

More specifically, U.S. Pat. No. 7,196,492 discloses a method of implementing an idle stop mode of a fuel cell-supercapacitor hybrid system, in which the idle stop mode is determined based on the voltage of a main bus terminal and its change rate and the power generation of the fuel cell is suspended by the operation of a switch at an end of the fuel cell.

Moreover, U.S. Pat. No. 7,377,345 discloses an idle control system for a fuel cell vehicle equipped with a power converter. In this case, a power generation mode, where a fuel cell is operated at an optimal efficiency point, is performed when a vehicle load is small (i.e., during a normal load-following operation and a power generation stop mode where the power generation of the fuel cell is stopped is performed when the energy is high).

Furthermore, Korean Patent Publication No. 10-2010-0005768 also filed by the present applicant discloses an idle stop-start control method of a fuel cell hybrid vehicle including a fuel cell and a storage means, in which the air supply is cut off at a specific voltage such that the power generation of the fuel cell is automatically stopped without operation of a switch or power converter.

However, to date, neither a system nor a method for controlling the operation of a fuel cell hybrid system which can effectively avoid the low power and low efficiency region to of a fuel cell during operation has been effectively developed. This is true especially in relation to a more efficient idle stop-start control system and method.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method for controlling the operation of a fuel cell hybrid system. More specifically, the present invention includes a fuel cell, as a main power source, and an energy storage device, as an auxiliary power source. Advantageously, the present system can effectively avoid a low power and low efficiency region of a fuel cell during operation, and provide more efficient idle stop-start control.

In one aspect, the present invention provides a system and method are provided for controlling the operation of a fuel cell hybrid system. More specifically, in the system and method allow a vehicle to run in a normal operation mode of a fuel cell system. If an idle stop condition is satisfied during the normal operation mode of the fuel cell system, an air supply is cut off to a fuel cell to stop the power generation of the fuel cell and reduce the voltage of the fuel cell. Then, the voltage of a bidirectional high voltage DC-DC converter is reduced. This DC-DC converter is illustratively connected between a high voltage battery and a main bus terminal. As a result, the output of the fuel cell is controlled to a predetermined value ($V_2$) which is maintained. While maintaining the predetermined value, the high voltage battery is forcibly charged by the output current of the fuel cell generated by maintaining the reduced voltage of the DC-DC converter. In doing so, the oxygen in a cathode is exhausted and the voltage of the fuel cell becomes lower than the voltage of the DC-DC converter.

In another embodiment, in a normal operation mode of the fuel cell system, a load-following operation control is performed. In a load-following operation control the to output of the fuel cell is controlled according to the load. Additionally, a voltage upper limit control is performed such that the use of a low output region of the fuel cell is limited by the voltage upper limit control of the bidirectional high voltage DC-DC converter. More specifically, in the voltage upper limit control a voltage control upper limit value of the bidirectional high voltage DC-DC converter is determined and the voltage of the bidirectional high voltage DC-DC converter controlled according to the load during operation is limited to the voltage control upper limit value of the bidirectional high voltage DC-DC converter.

In another embodiment of the present invention, the voltage of the bidirectional high voltage DC-DC converter may be increased to a predetermined value ($V_3$) and maintained at the predetermined value ($V_3$) in response to a restart condition being satisfied in the idle stop mode of the fuel cell system. Then the fuel cell system may be restarted by initiating the air supply to the fuel cell in a state where the voltage of the main bus terminal increases such that the voltage of the fuel cell increases to the predetermined value ($V_3$) and the current output of the fuel cell are made. After the fuel cell has been stabilized (e.g., the restart process has terminated) and the fuel cell system enters the normal operation mode, the maintenance of the predetermined value ($V_3$) of the voltage of the bidirectional high voltage DC-DC converter is cancelled.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
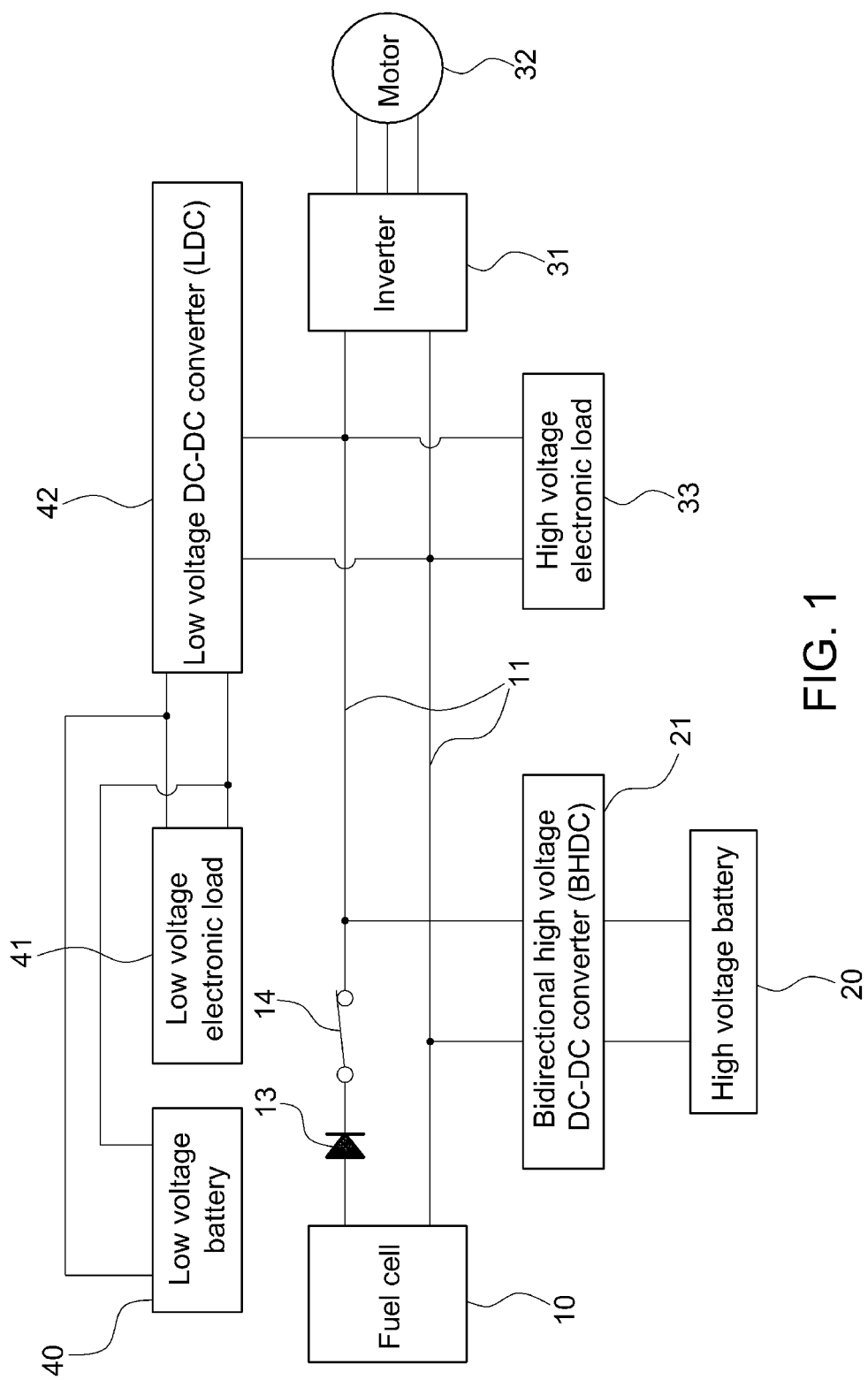
FIG. 1 is a schematic diagram showing the configuration of a fuel cell hybrid system to which a control system and method in accordance with an exemplary embodiment of the present invention is applied.

Reference numerals set forth in the Drawings includes reference to the following elements as further discussed below:

10: fuel cell
11: main bus terminal
13: diode
14: relay
20: high voltage battery
21: bidirectional high voltage DC-DC converter (BHDC)
31: inverter
32: drive motor
40: low voltage battery
41: low voltage electronic load
42: low voltage DC-DC converter (LDC)

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention provides a system and method for controlling the operation of a fuel cell hybrid system. More specifically, the fuel cell hybrid system includes a fuel cell, as a main power source, and an energy storage device, as an auxiliary power source, which can effectively avoid a low power and low efficiency region of a fuel cell during operation.

Advantageously, the present invention provides a method for effectively avoiding a low power and low efficiency region of a fuel cell during operation by controlling the voltage to of a bidirectional high voltage DC-DC converter connected to an energy storage device as an auxiliary power source (e.g., a high voltage battery in one embodiment) and, while at the same time, controlling the air supply.

FIG. 1 is a schematic diagram showing the configuration of a fuel cell hybrid system to which a control method in accordance with an embodiment of the present invention is applied.

As shown in the FIG. 1, a fuel cell-battery hybrid system for a vehicle illustratively has a fuel cell 10, as a main power source, and a high voltage battery 20 (i.e., a main battery), as an auxiliary power source, which are connected in parallel through a main bus terminal 11. A bidirectional high voltage DC-DC converter (BHDC) 21 is connected, e.g., in series, to the high voltage battery 20 between the high voltage battery 20 and the fuel cell 10, to control the output of the high voltage battery 20. Furthermore, an inverter 31 (which is connected to drive motor 32) is connected to the fuel cell 10 and the main bus terminal 11 on the output side of the high voltage battery 20. The system also has other loads such as, a high voltage electronic load 33, a low voltage battery 40, and a low voltage electronic load 41, which are all vehicle loads that operated in addition to the inverter 31 and the drive motor 32. In order to convert a high voltage to a low voltage, a low voltage DC-DC converter (LDC) 42 is connected between the low voltage battery 40 and the main bus terminal 11e.

Here, the fuel cell 10, used as the main power source of the vehicle, and the high voltage battery 20, used as the auxiliary power source, are connected in parallel to respective loads in the system such as the inverter 31, the drive motor 32, etc. through the main bus terminal 11. Additionally, the bidirectional high voltage DC-DC converter 21 connected to terminals of the high voltage battery 20 are connected to the main bus terminal 11 on the output side of the fuel cell 10 to control the output of the fuel cell 10 and the output of the high voltage battery 20 by controlling the voltage of the bidirectional high voltage DC-DC converter 21 (e.g., the output voltage to the main bus terminal).

A diode 13 is provided to prevent a reverse current from flowing through the fuel cell to 10 and a relay 14 is provided for selectively connecting the fuel cell 10 to the main bus terminal 11. The relay 14 is in a closed state in an idle stop-start state of the fuel cell hybrid system as well as during normal operation of the fuel cell 10 and is in an opened state only during key-off of the vehicle (i.e., during normal shutdown according to key-off operation) or during emergency shutdown.

Moreover, the inverter 31 for rotating the drive motor 32 is connected to the output sides of the fuel cell 10 and the high voltage battery 20 through the main bus terminal 11 to convert the phase of the power supplied from the fuel cell 10 and/or the high voltage battery 20, thereby driving the drive motor 32.

In the above-described fuel cell hybrid system, the drive motor 32 is driven in a fuel cell mode in which the output (current) of the fuel cell 10 may be only used, in an electric vehicle (EV) mode in which the output of the high voltage battery 20 may be only used, or in a hybrid mode in which the output of the fuel cell 10 may be assisted by the output of the high voltage battery 20.

In the EV mode which operates before the drive motor 32 is driven by the output of the fuel cell 10 after the idle stop-start process of the fuel cell system, the power generation of the fuel cell 10 is stopped, and thus the drive motor 32 and the vehicle should be driven by just the output of the high voltage battery 20.

In the EV mode, in a state where the relay 14 is turned on and the power generation of the fuel cell 10 is stopped (e.g., by cutting off the air supply to the fuel cell 10), the voltage of the high voltage battery 20 is boosted via the bidirectional high voltage DC-DC converter 21 connected to the high voltage battery 20 to increase the voltage of the main bus terminal 11 such that the vehicle loads, such as the inverter 31, the drive motor 32, etc., can be driven via only the output of the high voltage battery 20.

Illustratively, the air supply is cut off during the idle stop of the fuel cell system and started during the restart of the fuel cell system. When the fuel cell system returns to a normal operation mode after the restart process, the output of the fuel cell 10 is then to follow-up controlled according to the vehicle load (i.e., a load-following operation control) in a state where the air is normally supplied, and the boosting operation of the bidirectional high voltage DC-DC converter 21 is cancelled.

Figure 2:
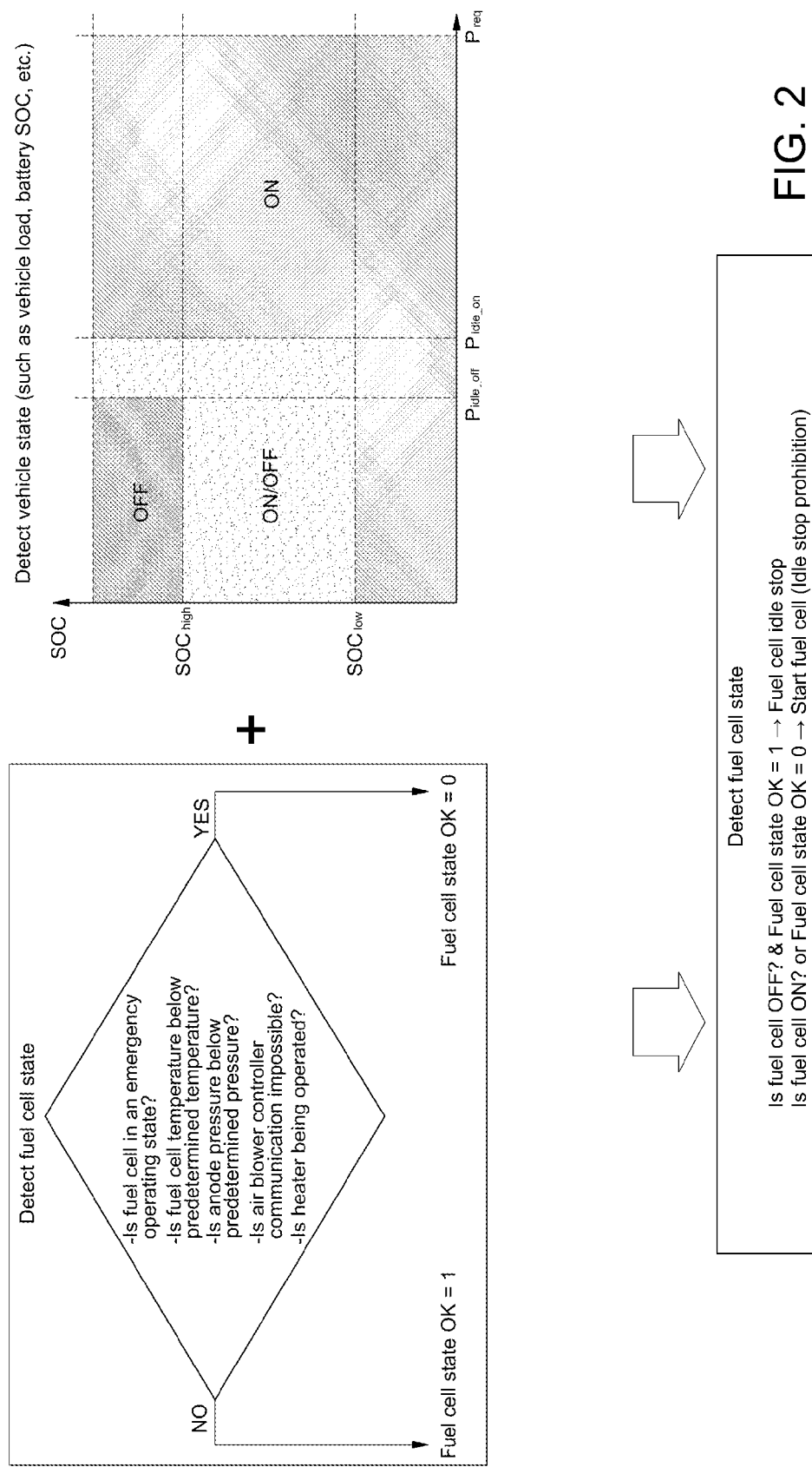
FIG. 2 is a diagram showing the criteria for determining an idle stop condition, an idle stop prohibition condition, and a start condition of a fuel cell system in a control process in accordance with an exemplary embodiment of the present invention.

FIG. 2 is a diagram showing the steps for determining that an idle stop condition (in which the air supply is cut off and the fuel cell power generation is stopped) should occur, an idle stop prohibition condition should occur, or a start condition should occur in the fuel cell system in accordance with an embodiment of the present invention.

As shown in FIG. 2, a controller controls an idle stop mode, an idle stop prohibition mode, and a start mode of the fuel cell system through a vehicle state detection process and a fuel cell state detection process. First, in the vehicle state detection process, the controller determines fuel cell ON (power generation) and OFF (power generation stop) conditions from the vehicle load and the state of charge (SOC) of the high voltage battery (which correspond to vehicle state conditions). Moreover, in the fuel cell state detection process, the controller determines an idle stop condition, an idle stop prohibition condition, and a start condition of the fuel cell system in view of emergency operating conditions of the fuel cell, the temperature of a fuel cell stack, the pressure of an anode of the fuel cell stack, the communication state between controllers, the operation of a heater, etc. (which correspond to fuel cell state conditions).

Here, a fuel cell idle stop process is performed when the fuel cell OFF condition of the vehicle state detection process and the idle stop condition of the fuel cell state detection process are satisfied at the same time, and a fuel cell restart process is performed when any of the fuel cell ON conditions of the vehicle state detection process and the start condition of the fuel cell state detection process are satisfied.

As shown in the left figure of FIG. 2, in the vehicle state detection process, when the vehicle load is greater than a predetermined reference value (e.g., above a fuel cell request output, $P_{idle\_on}$), it is determined that the fuel cell ON condition is satisfied.

Moreover, only when the vehicle load is smaller than the predetermined reference to value (e.g., below a fuel cell request output, $P_{idle\_off}$) and the SOC of the high voltage battery is higher than a predetermined upper limit value ($SOC_{high}$), it is determined that the fuel cell OFF condition is satisfied.

Furthermore, when the vehicle load is less than a predetermined lower limit ($P_{low}$), but the SOC of the high voltage battery is lower than a predetermined lower limit value ($SOC_{low}$), it is determined that the fuel cell ON condition is satisfied. However, the output value of the fuel cell during operation is maintained above the predetermined value ($P_{idle\_on}$) to charge the high voltage battery.

In the vehicle state detection process, the fuel cell ON condition may be further satisfied during full acceleration or during sudden acceleration above a certain level in view of the response of the system, and the fuel cell OFF condition may be further satisfied during regenerative braking to increase the recovery rate of regenerative braking In the fuel cell state detection process, as shown in the right figure of FIG. 2, when the fuel cell is in an emergency operating state, (e.g., when the temperature of the fuel cell stack is below a predetermined temperature, when the pressure of the anode of the fuel cell stack is below a predetermined pressure, when there is a failure in communication from an air blower controller, or when the heater is being operated), it is determined that the power generation of the fuel cell should be maintained (in the idle stop prohibition condition and the start condition) (i.e., 'fuel cell state OK=0' in FIG. 2). Otherwise, it is determined that the idle stop mode of the fuel cell system can be performed (i.e., 'fuel cell state OK=1' in FIG. 2).

In the vehicle state detection process and the fuel cell state detection process, the fuel cell system can enter the idle stop mode only when the fuel cell OFF condition and the idle stop conditions are satisfied at the same time (i.e., if 'fuel cell is OFF and fuel cell state OK=1' in FIG. 2). Otherwise, when any of the conditions are not satisfied, entry into the idle stop mode of the fuel cell system is prohibited.

For example, even if the vehicle state conditions such as the vehicle load and the to SOC of the high voltage battery satisfy the fuel cell OFF conditions, when it is determined that the idle stop prohibition conditions are satisfied (i.e., if 'fuel cell state OK=1') in the fuel cell state detection process, entry into the idle stop mode of the fuel cell system may be prohibited.

Moreover, when the fuel cell ON conditions of the vehicle state detection process and the idle stop prohibition condition of the fuel cell state detection process are satisfied (i.e., if 'fuel cell is ON or fuel cell state OK=0' in FIG. 2), the idle stop mode is prohibited (e.g., in the case of the normal operation state) or the fuel cell is restarted (e.g., in the case of the idle state). For example, even if the vehicle state conditions such as the vehicle load and the SOC of the high voltage battery do not satisfy the fuel cell ON conditions e.g., if 'fuel cell is OFF') in the idle stop mode of the fuel cell system, when it is determined that the power generation of the fuel cell should be restarted (in the start condition where 'fuel cell state OK=0') in the fuel cell state detection process, the fuel cell may still be restarted.

Figure 3:
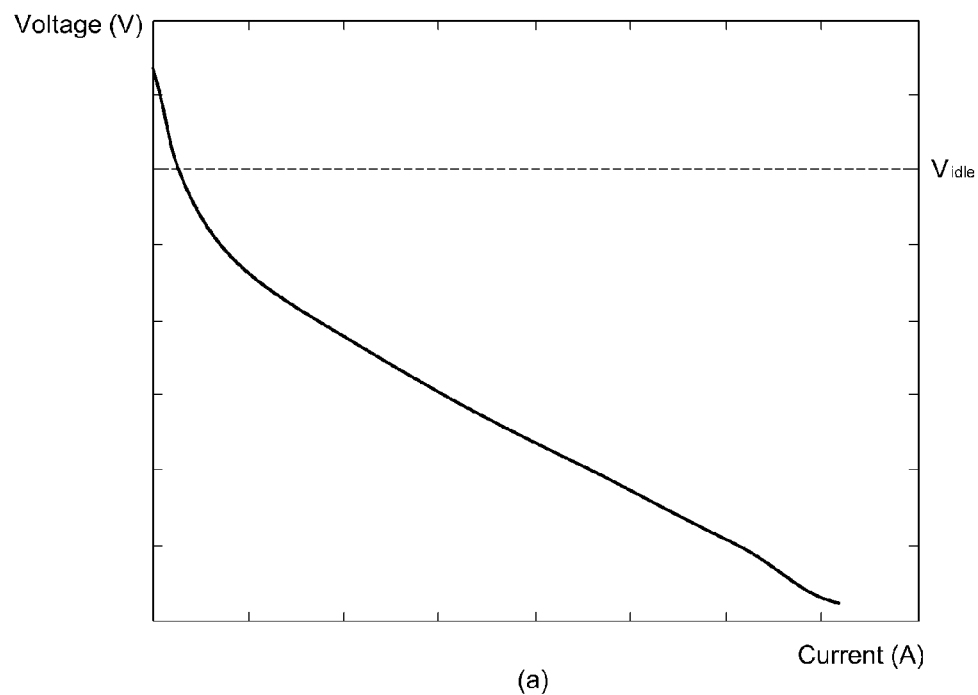
FIG. 3 is a diagram showing the criteria for determining a vehicle load condition.
Figure 3:
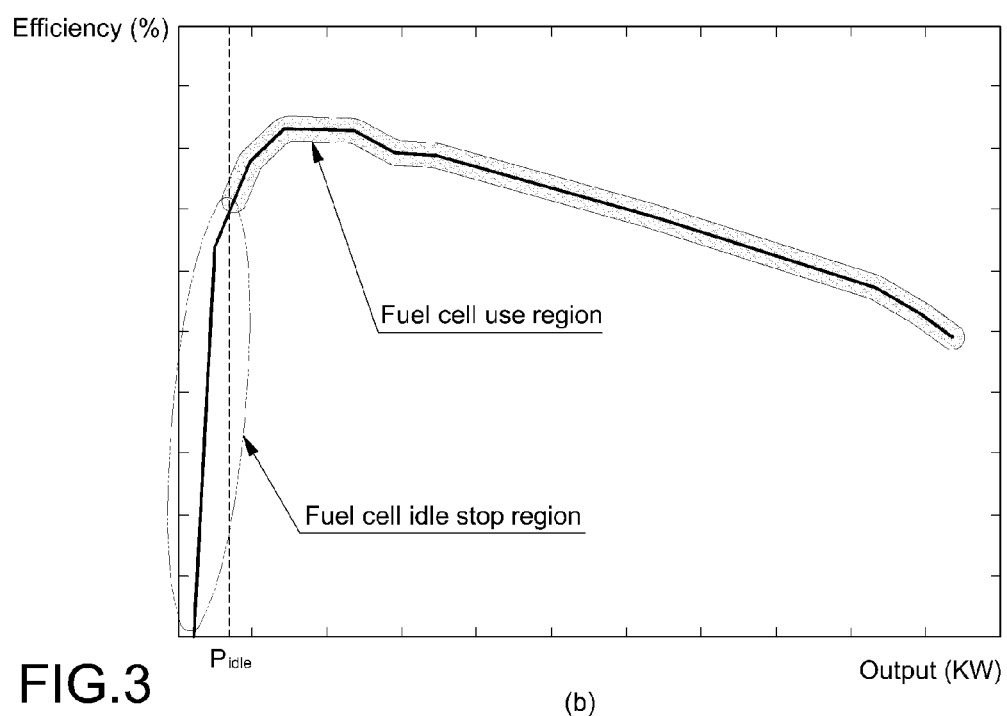

FIG. 3 is a diagram showing the criteria for determining a vehicle load condition, in which (b) shows the efficiency with respect to the output of the fuel cell system (including the power of the fuel cell stack and the power of balance-of-plant components) and a voltage curve of voltage which corresponds to the output $V_{idle}$ corresponding to the output $P_{idle}$.

The efficiency in a low output region is often very low due to power balancing issues of all of the various system components. In order to avoid such imbalance, an output, $P_{idle}$, at a point in time when the efficiency is reduced, is determined as the criterion for determining whether a vehicle load condition has been met and, in the voltage-current curve of (a) of FIG. 3, a voltage $V_{idle}$ corresponding to the output $P_{idle}$ or a voltage value ($V_{\hat{3}}$ in FIG. 5) near the voltage $V_{idle}$ is determined as a voltage control upper limit value of the bidirectional high voltage DC-DC converter such that the voltage of the bidirectional high voltage DC-DC converter is limited to the predetermined voltage control upper limit value in the normal operation mode of the fuel cell system, thereby limiting the use of the low output region of the fuel cell.

As such, in the present invention, the voltage control upper limit value of the bidirectional high voltage DC-DC converter is determined such that the voltage of the bidirectional high voltage DC-DC converter is limited to the predetermined voltage control upper limit value controlled during the normal operation mode of the fuel cell system, i.e., in a state where the load-following operation control of the fuel cell is performed, and thus the use of the low output region of the fuel cell is limited while the voltage of the bidirectional high voltage DC-DC converter is limited to the predetermined voltage control upper limit value.

When the voltage upper limit value of the bidirectional high voltage DC-DC converter is determined, the output of the fuel cell is maintained above a predetermined level, and thus the use of the low output region of the fuel cell is limited. However, when the output of the fuel cell system is consistently maintained above $P_{idle}$, the battery may be overcharged in the low power region and the amount of regenerative braking may accordingly be limited. Therefore, as mentioned above, during regenerative braking or during high output and high SOC conditions (i.e., if 'fuel cell is OFF' in FIG. 2) in the vehicle state detection process, the fuel cell is turned off (i.e., in the idle stop mode is applied), thereby avoiding a low efficiency region in the system.

Referring to (b) of FIG. 3, a fuel cell idle stop region and a fuel cell use region are separately illustrated. In the present invention, the fuel cell is used in the 'fuel cell use region' or completely turned off in the 'fuel cell stop region' in response to reaching a predetermined threshold, $P_{idle}$. Accordingly, the overall efficiency of the entire systems is effectively increased.

Figure 4:
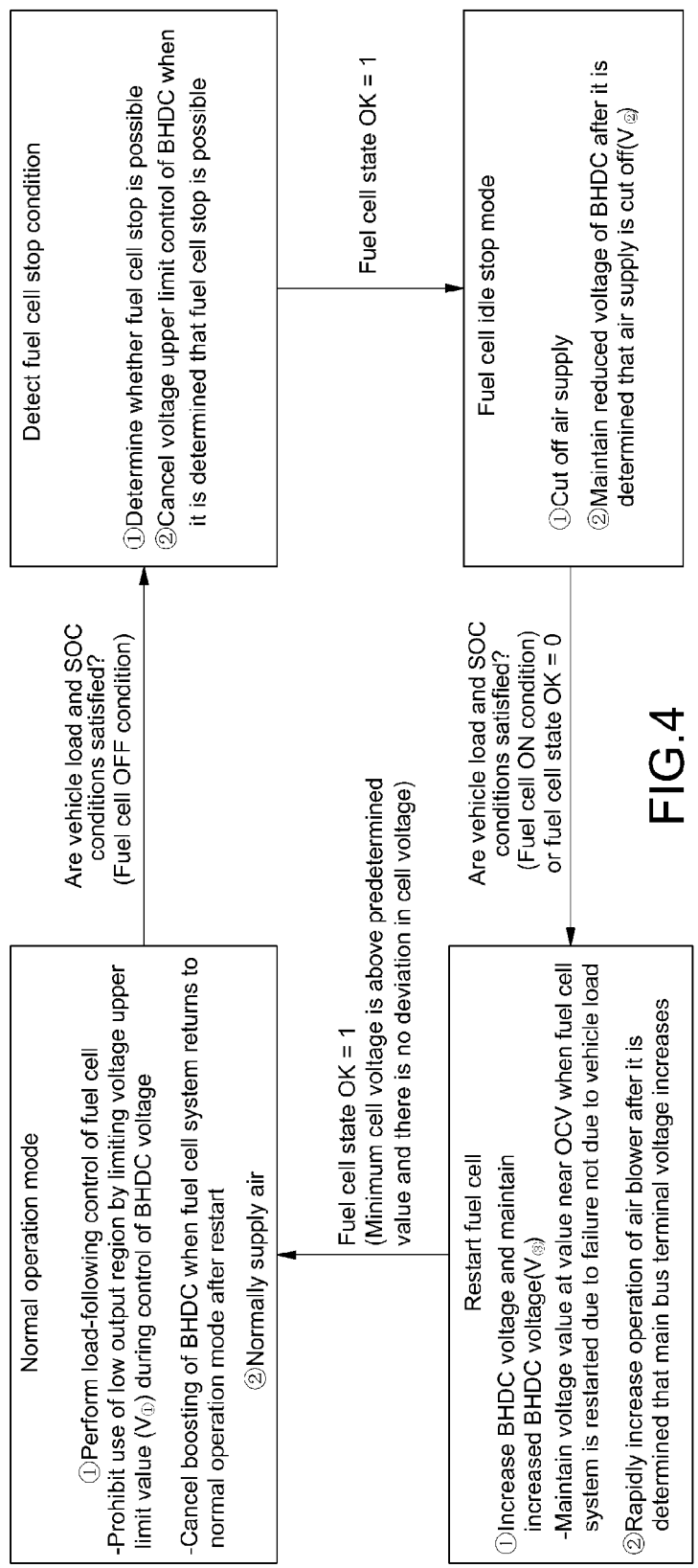
FIG. 4 is a diagram showing an idle stop-start process of a fuel cell system in accordance with an exemplary embodiment of the present invention.
Figure 5:
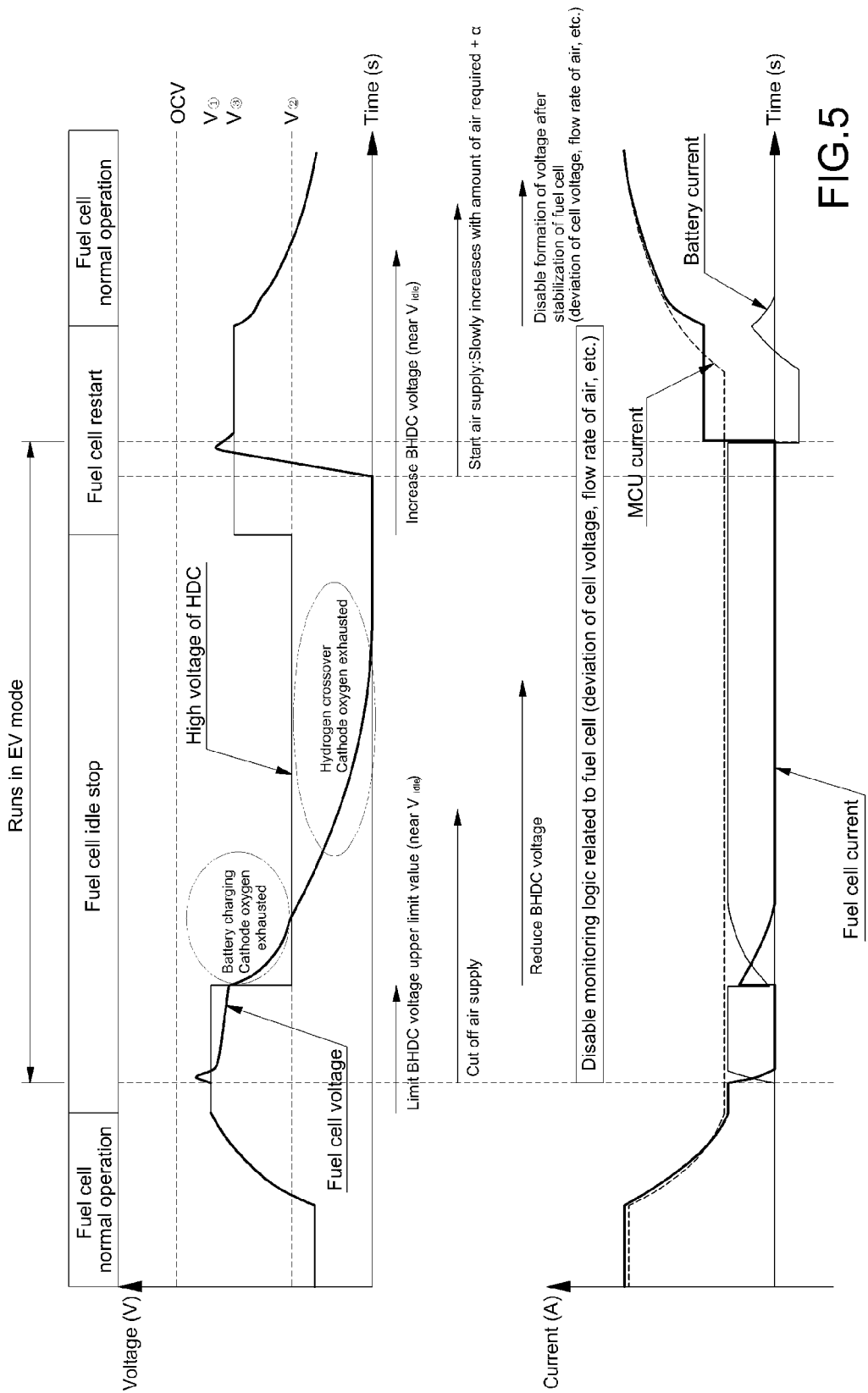
FIG. 5 is a diagram showing an example of an idle stop-start process of a fuel cell system in accordance with an exemplary embodiment of the present invention.

FIG. 4 is a diagram showing an idle stop-start process of a fuel cell system in accordance with the illustrative embodiment of the present invention, and FIG. 5 is a diagram showing an example of an idle stop-start process of a fuel cell system in accordance with the illustrative embodiment of the present invention. The control process according to to the present invention will be described step by step with reference to FIGS. 4 and 5 below.

First, as shown in the figures, in the normal operation mode of the fuel cell system, a load-following operation control, in which the output of the fuel cell is controlled according to the load on the system, is performed, and the output control of the fuel cell is performed in such a manner that a controller controls the output voltage of the main bus terminal of the bidirectional high voltage DC-DC converter (hereinafter referred to as the voltage of the bidirectional high voltage DC-DC converter (BHDC)).

In the present invention, the voltage control upper limit value ($V_{\hat{2}}$ in FIG. 5) of the bidirectional high voltage DC-DC converter is determined with respect to the normal operation mode of the fuel cell system such that the voltage of the bidirectional high voltage DC-DC converter controlled according to the load is limited to the predetermined voltage control upper limit value, and thus the use of the low output region of the fuel cell is limited.

As such, when the voltage of the bidirectional high voltage DC-DC converter is controlled during the load-following operation in the normal operation mode, the voltage of the bidirectional high voltage DC-DC converter is limited to the predetermined voltage control upper limit value such that the output of the fuel cell is maintained above a predetermined level.

Then, if it is determined that the vehicle state conditions such as the vehicle load and the SOC of the high voltage battery satisfy the fuel cell OFF condition in the vehicle state detection process, which has been described with reference to FIG. 2, it is determined that the fuel cell state satisfies the idle stop condition of the fuel cell system in the fuel cell state detection process.

Here, even if the vehicle state conditions satisfy the fuel cell OFF condition, if it is determined that the vehicle state conditions correspond to the idle stop prohibition condition of the fuel cell system in the fuel cell state detection process (i.e., if 'fuel cell stack OK=0' in FIG. 2), the idle stop of the fuel cell system is prohibited such that the fuel cell is in the operation state, and the voltage upper limit control, in which the voltage of the bidirectional high voltage DC-DC converter is limited to the predetermined voltage control upper limit value ($V_{\hat{1}}$) is cancelled so that the fuel cell can be used even in the low output region.

The reason for this is as follows. When the output of the fuel cell is low, and the SOC of the high voltage battery is high, the fuel cell cannot be turned off (i.e., under the idle stop prohibition condition), if the output of the fuel cell is continuously maintained above a predetermined level by the voltage upper limit control of the bidirectional high voltage DC-DC converter, the high voltage battery may be overcharged.

In FIG. 5, the voltage control upper limit value $V_{\hat{1}}$ may be predetermined to the voltage $V_{idle}$ of FIG. 3 or the voltage value near the voltage $V_{idle}$. If it is determined that the idle stop condition of the fuel cell system is satisfied in the fuel cell state detection process, the idle stop process of the fuel cell system is performed. That is, the air supply to the fuel cell is cut off (e.g., by turning off an air supply system such as an air blower) such that the voltage of the fuel cell drops below the voltage of the main bus terminal and thus the output (i.e., the current output) of the fuel cell is not supplied to the main bus terminal (refer to the fuel cell current after cutting off the air supply in FIG. 5).

Subsequently, after a predetermined time when the air supply is cut off (or after it is determined by a flowmeter, for example, that the air is not supplied), the voltage of the bidirectional high voltage DC-DC converter is reduced to a predetermined value ($V_{\hat{2}}$ in FIG. 5) so that oxygen remaining in a cathode is exhausted. That is, when the voltage of the bidirectional high voltage DC-DC converter is reduced below the predetermined value and maintained at that level, the voltage within the main bus terminal is reduced, and in this case the current from the fuel cell is output again to the main bus terminal while the oxygen in the cathode is exhausted. At this time, the high voltage battery is forcibly charged by the output of the fuel cell.

That is, before the voltage of the fuel cell drops below the voltage of the bidirectional high voltage DC-DC converter (i.e., the voltage of the main bus terminal), the high voltage battery is charged by the output current of the fuel cell generated while the oxygen in the cathode is exhausted, and thus the oxygen remaining in the cathode of the fuel cell can be removed to a predetermined level by the forcible charging of the high voltage battery.

Moreover, when the voltage of the fuel cell is reduced below the voltage of the bidirectional high voltage DC-DC converter by the exhaustion of oxygen in the cathode, the charging of the high voltage battery is terminated. However, as the hydrogen in the anode continuously crosses over to the cathode through an electrolyte membrane, the oxygen in the cathode is gradually exhausted. Therefore, when the voltage of the fuel cell is completely removed, the entry into the idle stop mode is completed.

During the power generation stop mode of the fuel cell after the air supply is cut off, the hydrogen in the anode crosses over to the cathode, and thus the voltage of the fuel cell is naturally reduced to zero but, at this time, the hydrogen crossing over to the cathode is wasted. Therefore, the output of the fuel cell generated while the oxygen in the cathode is exhausted can be used to charge the high voltage battery by reducing the voltage of the bidirectional high voltage DC-DC converter to the predetermined value ($V_{\hat{2}}$) after the air supply is cut off and, at the same time, the voltage of the fuel cell can be reduced, thereby providing advantageous effects in terms of durability and fuel efficiency.

Furthermore, when the voltage of the fuel cell drops below the voltage of the main bus terminal, i.e., the voltage of the bidirectional high voltage DC-DC converter after the high voltage battery is forcibly charged while the oxygen in the cathode is exhausted, the current output is no loner supplied from the fuel cell, and thus the EV mode, in which the drive motor is driven only by the output of the high voltage battery, is performed.

Referring to FIG. 5, it can be seen that the voltage of the bidirectional high voltage DC-DC converter and the voltage of the fuel cell are limited to the voltage control upper limit value $V_{\hat{1}}$ before the air supply is cut off and, at this time, the current of the fuel cell is maintained at a constant level by the voltage upper limit control. It can also be seen that the to current of the battery is supplied to the inverter through a motor control unit (MCU) so that the vehicle runs in the EV mode until the fuel cell is restarted after the air supply is cut off. Here, the EV mode in which the voltage of the main bus terminal is maintained at the predetermined value ($V_{\square}$) (which may be a constant value or variable value) by controlling the voltage of the bidirectional high voltage DC-DC converter is performed.

The determination of the predetermined value ($V_{\square}$), in which the voltage of the bidirectional high voltage DC-DC converter is reduced, after the air supply is cut off, should be optimized in terms of the efficiency of the bidirectional high voltage DC-DC converter and the efficiency of the drive motor.

While it is advantageous to determine the predetermined value ($V_{\square}$) at a high level in terms of the efficiency of the drive motor, it may be better to determine the predetermined value ($V_{\hat{2}}$) at a lower level such that the vehicle runs in the EV mode in terms of the efficiency of the bidirectional high voltage DC-DC converter. Therefore, it is necessary to determine an optimum value ($V_{\hat{2}}$).

While the vehicle runs in the EV mode, as mentioned above, if the vehicle state conditions satisfy the fuel cell ON condition or if the fuel cell state conditions satisfy the start condition (i.e., if 'fuel cell stack OK=0' in FIG. 2), the fuel cell system is restarted.

At this time, the voltage of the bidirectional high voltage DC-DC converter is increased to a predetermined value ($V_{\hat{3}}$ in FIG. 5) and maintained at that level, thus preventing the output of the fuel cell from being excessively supplied to the main bus terminal.

Here, the predetermined value ($V_{\hat{3}}$) corresponding to the voltage of the bidirectional high voltage DC-DC converter increased during restart of the fuel cell system may be determined to be and controlled to a voltage $V_{idle}$ of FIG. 3 or a voltage value near the voltage $V_{idle}$.

While the vehicle load condition is not satisfied (i.e., in a low load state where the to vehicle load does not satisfy a predetermined reference value, that is, when the vehicle load is below the fuel cell request output $P_{idle\_on}$), if the fuel cell system is restarted due to a failure, the voltage of the bidirectional high voltage DC-DC converter may be increased to a value near the open circuit voltage, i.e., to a maximum value below the OCV. The reason for this is that when the voltage value for the restart, i.e., the predetermined value ($V_{\hat{3}}$) corresponding to the increased voltage of the bidirectional high voltage DC-DC converter is maintained at a value near the voltage $V_{idle}$ of FIG. 2 in a state where the vehicle load is below the reference value and the SOC of the high voltage battery is high, the high voltage battery is overcharged by the output of the fuel cell.

Then, after it is determined by, e.g., a voltmeter, for example, that the voltage of the main bus terminal is maintained at the predetermined value ($V_{\hat{3}}$), the air supply is initiated to thereby restart the power generation of the fuel cell. Here, the rotational speed of the air blower is increased at a point in time when the air supply is started so that the voltage of the fuel cell is increased to the predetermined value ($V_{\hat{3}}$) corresponding to the increased voltage of the bidirectional high voltage DC-DC converter.

At this time, the voltage of the fuel cell is increased via the air supply so that the fuel cell outputs a predetermined output power, which is equal to the predetermined value ($V_{\hat{3}}$) corresponding to the increased voltage of the bidirectional high voltage DC-DC converter.

Moreover, to rapidly increase the voltage of the fuel cell when the air supply is initiated during restart of the fuel cell system, the air blower is driven such that a predetermined amount ($\alpha$) of air is supplied to the fuel cell in addition to the amount of air corresponding to the amount of current required. Therefore, the amount of air supplied to the fuel cell is the sum of 'the amount of air required' and 'the predetermined amount (α) of air'.

Subsequently, the fuel cell state is continuously monitored and, if the minimum cell to voltage, the deviation of cell voltage, the flow rate of air, etc. are stabilized, the restart process is terminated, and the maintenance of the voltage of the bidirectional high voltage DC-DC converter at the predetermined value is cancelled.

Then, during the normal operation mode, the normal load-following operation of the fuel cell is performed again. At this time, the voltage of the bidirectional high voltage DC-DC converter is limited to the control upper limit value $V_{\hat{1}}$ as mentioned above such that the fuel cell is not used in the low output region and outputs a predetermined output power or higher.

As such, the control process of the present invention has been described. Additionally, it can be seen from FIG. 5 that the avoidance operation of the low efficiency region of the fuel cell is effectively performed by controlling the voltage of the bidirectional high voltage DC-DC converter and, at the same time, controlling the air supply during the idle stop process and the restart process according to the present invention (it can be seen that a voltage between the OCV and the voltage $V_{\hat{1}}$ is not generated).

The predetermined voltage values $V_{\hat{1}}$ and $V_{\hat{3}}$ are determined as the voltages near the voltage $V_{idle}$, and it is desired that $V_{\hat{1}}$ can be determined to a voltage corresponding to $P_{idle\_off}$ and $V_{\hat{3}}$ be determined to a voltage corresponding to $P_{idle\_on}$ in terms of hysteresis.

Moreover, the amount of air required when the air supply is started during the restart process is calculated, e.g., from the amount of current required for the fuel cell. Here, the predetermined amount (α) of air is further supplied to the fuel cell in addition to the amount of air corresponding to the amount of current required such that the voltage of the fuel cell can be more quickly stabilized.

Furthermore, as mentioned above, the voltage control value ($V_{\hat{2}}$) of the bidirectional high voltage DC-DC converter is determined to be an optimum value in view of the efficiency of the bidirectional high voltage DC-DC converter and the efficiency of the drive to motor when the vehicle runs in the EV mode during the idle stop mode of the fuel cell system, and monitoring logic related to the deviation of cell voltage, the flow rate of air, etc. is disabled to prevent the fuel cell system and the vehicle from being shut down due to the monitoring logic.

In FIG. 5, during the restart process of the fuel cell, in a state where the relay (designated by reference numeral 14 in FIG. 1) at the end of the fuel cell is turned on, the voltage of the bidirectional high voltage DC-DC converter is increased to a predetermined level and the voltage of the fuel cell is increased by the air supply to the fuel cell such that the fuel cell outputs a predetermined output power, which is equal to the predetermined value corresponding to the increased voltage of the bidirectional high voltage DC-DC converter, thereby completing the restart. Furthermore, the sequence during the normal start may be used as it is.

Advantageously, in the present invention, it is possible to effectively avoid the low power and low efficiency region of the fuel cell during operation by the voltage upper limit control of the bidirectional high voltage DC-DC converter, improve the durability of the fuel cell system by the avoidance operation of the OCV region, and improve the fuel efficiency of the vehicle by the avoidance operation of the low efficiency region.

Moreover, in the idle stop process, the output of the fuel cell generated while the oxygen in the cathode is exhausted can be used to charge the high voltage battery, and it is possible to achieve a more efficient idle stop-start control method.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling the operation of a fuel cell hybrid system, the method comprising:
    determining, by a controller, whether an idle stop condition has been satisfied during a normal operation mode of the fuel cell hybrid system;
    cutting off air supply to a fuel cell to stop the power generation of the fuel cell and reduce the voltage of the fuel cell, in response to the idle stop condition being satisfied;
    reducing the voltage of a bidirectional converter, connected in series to a battery between the battery and the fuel cell via a bus terminal, to control the output of the battery;
    controlling the output of the fuel cell, based on a first predetermined value and maintaining the first predetermined value; and
    charging, forcibly, the battery via the output current of the fuel cell generated by maintaining the reduced voltage of the bidirectional converter, wherein oxygen in a cathode is exhausted and the voltage of the fuel cell becomes lower than the voltage of the bidirectional converter,
    wherein in the normal operation mode of the fuel cell hybrid system, load-following operation control, in which the output of the fuel cell is controlled according to the load, is performed, and voltage upper limit control, in which a voltage control upper limit value of the bidirectional converter is determined and the voltage of the bidirectional converter controlled according to the load during operation is limited to the voltage control upper limit value of the bidirectional converter, is performed such that the use of a low output region of the fuel cell is limited by the voltage control upper limit value of the bidirectional converter.

2. The method of claim 1, wherein the bidirectional converter is a bidirectional high voltage DC-DC converter and in a state where the voltage of the fuel cell is reduced below the voltage of the bidirectional high voltage DC-DC converter and the voltage of the bus terminal by the exhaustion of oxygen in the cathode after forcibly charging the battery, an electric vehicle (EV) mode, in which a drive motor is driven only by the output of the battery, is performed, and the voltage of the bus terminal is determined by controlling the voltage of the bidirectional high voltage DC-DC converter.

3. The method of claim 1, wherein in the normal operation mode of the fuel cell hybrid system, if a vehicle load and a state of charge (SOC) of the high voltage battery satisfy a fuel cell OFF condition and, at the same time if the fuel cell state does not correspond to a predetermined idle stop prohibition condition, a determination is made that the idle stop condition is satisfied.

4. The method of claim 3, wherein if the vehicle load is smaller than a predetermined reference value and if the SOC of the high voltage battery is greater than a predetermined upper limit value, it is determined that the fuel cell OFF condition is satisfied.

5. The method of claim 3, wherein the voltage upper limit control of the bidirectional converter is cancelled if the fuel cell state corresponds to the predetermined idle stop prohibition condition.

6. The method of claim 1, further comprising:
increasing the voltage of the bidirectional converter to a second predetermined value and maintaining the second predetermined value if a restart condition is satisfied in the idle stop mode of the fuel cell hybrid system;
restarting the fuel cell hybrid system by starting the air supply to the fuel cell in a state where the voltage of the bus terminal increases such that the voltage of the fuel cell increases to the second predetermined value and the current output of the fuel cell is made; and
canceling the maintenance of the second predetermined value of the voltage of the bidirectional converter after stabilization of the fuel cell such that the restart process is terminated and the fuel cell system enters the normal operation mode.

7. The method of claim 6, wherein when the air supply to the fuel cell is started in the restarting of the fuel cell system, an air blower is driven such that a predetermined amount of air is supplied to the fuel cell in addition to the amount of air calculated from the amount of current required for the fuel cell.

8. The method of claim 6, wherein if the fuel cell state corresponds to a predetermined idle stop prohibition condition and the fuel cell system is restarted, the voltage of the bidirectional converter is increased to a predetermined maximum value below the open circuit voltage and maintained at that level.

9. The method of claim 3, wherein the idle stop prohibition condition is selected from a group consisting of the fuel cell being in an emergency operating state, the temperature of a fuel cell stack being below a predetermined temperature, the pressure of an anode of the fuel cell stack being below a predetermined pressure, a failure in communication from an air blower controller and a heater is being operated.

10. A system for controlling the operation of a fuel cell hybrid system, the system comprising:
a hybrid fuel cell system configured to
determine, by a controller, if an idle stop condition has been satisfied during a normal operation mode of the hybrid fuel cell system, cut off air supply to a fuel cell to stop power generation of the fuel cell and reduce a voltage which the fuel cell outputs in response to determining that the idle stop condition has been satisfied,
reduce the voltage of a bidirectional converter, connected in series to a battery between the battery and the fuel cell via a bus terminal, to control the output of the battery,
control the output of the fuel cell, based on a first predetermined value and maintain the first predetermined value; and
charge the battery via the output current of the fuel cell generated by maintaining the reduced voltage of the bidirectional converter, wherein oxygen in a cathode of the fuel cell is exhausted and the voltage of the fuel cell becomes lower than the voltage of the bidirectional converter,
wherein in the normal operation mode of the fuel cell hybrid system, load-following operation control, in which the output of the fuel cell is controlled according to the load, is performed, and voltage upper limit control, in which a voltage control upper limit value of the bidirectional converter is determined and the voltage of the bidirectional converter controlled according to the load during operation is limited to the voltage control upper limit value of the bidirectional converter, is performed such that the use of a low output region of the fuel cell is limited by the voltage control upper limit value of the bidirectional converter.

* * * * *